United States Patent
des Jardins et al.

(10) Patent No.: US 10,076,765 B2
(45) Date of Patent: *Sep. 18, 2018

(54) DISPENSER AND METHOD OF DISPENSING AND CONTROLLING WITH A FLOW METER

(71) Applicant: NORDSON CORPORATION, Westlake, OH (US)

(72) Inventors: Stephen R. des Jardins, Encinitas, CA (US); Alan R. Lewis, Carlsbad, CA (US); Yuriy Suhinin, San Diego, CA (US)

(73) Assignee: Nordson Corporation, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/414,664

(22) Filed: Jan. 25, 2017

(65) Prior Publication Data
US 2017/0128976 A1    May 11, 2017

Related U.S. Application Data

(63) Continuation of application No. 14/591,300, filed on Jan. 7, 2015, now Pat. No. 9,579,678.

(51) Int. Cl.
*B05B 12/00* (2018.01)
*B05C 11/10* (2006.01)
(Continued)

(52) U.S. Cl.
CPC .......... *B05C 5/0225* (2013.01); *B05B 12/006* (2013.01); *B05B 12/087* (2013.01);
(Continued)

(58) Field of Classification Search
CPC ....... B05B 12/006; B05B 12/087; B05C 9/08; B05C 11/1002; B05C 11/02;
(Continued)

(56) References Cited

U.S. PATENT DOCUMENTS 1,599,081 A    9/1926  Douglas
4,090,262 A    5/1978  Schneider et al.
(Continued)

FOREIGN PATENT DOCUMENTS

EP    0499714 A1    8/1992
FR    2697825 A1    5/1994
(Continued)

OTHER PUBLICATIONS

International Patent Application No. PCT/US2015/067300: International Search Report dated Oct. 14, 2016, 22 pages.
(Continued)

*Primary Examiner* — Frederick C Nicolas
(74) *Attorney, Agent, or Firm* — Baker & Hostetler LLP (57) ABSTRACT

Systems and methods related to dispensing fluid and controlling a dispensing operation. The system includes a fluid dispenser including an inlet and an outlet, the dispenser being operable to start and stop the flow of the fluid from the outlet onto a substrate. The system also includes a fluid supply reservoir adapted to hold the fluid, and having an outlet coupled in fluid communication with the inlet of the fluid dispenser to establish a flow path for the fluid between the fluid supply reservoir and the outlet of the fluid dispenser. The fluid supply reservoir further includes a pneumatic input coupled to an air flow path adapted to receive pressurized air for forcing the fluid from the outlet of the reservoir. An electronic air flow meter device is operatively coupled to the air flow path to produce electrical output signals.

41 Claims, 5 Drawing Sheets

(51) Int. Cl.
  *B05C 9/08* (2006.01)
  *G01F 1/76* (2006.01)
  *G01K 13/02* (2006.01)
  *B05C 5/02* (2006.01)
  *B05B 12/08* (2006.01)
  *G05D 7/06* (2006.01)
  *B05C 11/02* (2006.01)

(52) U.S. Cl.
  CPC .............. *B05C 9/08* (2013.01); *B05C 11/101* (2013.01); *B05C 11/1002* (2013.01); *B05C 11/1013* (2013.01); *G01F 1/76* (2013.01); *G01K 13/02* (2013.01); *G05D 7/0676* (2013.01); *B05C 5/02* (2013.01); *B05C 11/02* (2013.01); *B05C 11/1034* (2013.01); *G01K 2013/024* (2013.01)

(58) Field of Classification Search
  CPC ..... B05C 11/1034; B05C 5/0225; B05C 5/02; B05C 11/1013; B05C 11/101; G01K 13/02; G01K 2013/024; G01F 1/76; G05D 7/0676
  See application file for complete search history.

(56) References Cited

U.S. PATENT DOCUMENTS

| | | | |
|---|---|---|---|
| 4,430,886 A | 2/1984 | Rood | |
| 4,629,164 A | 12/1986 | Sommerville | |
| 5,188,258 A | 2/1993 | Iwashita | |
| 5,481,260 A | 1/1996 | Buckler et al. | |
| 5,520,333 A | 5/1996 | Tofte | |
| 6,471,778 B1 * | 10/2002 | Baltz | B05B 5/16 118/600 |
| 6,715,506 B1 | 4/2004 | Ikushima | |
| 7,967,168 B2 | 6/2011 | Geier et al. | |
| 8,136,477 B2 | 3/2012 | Cho | |
| 8,307,779 B2 * | 11/2012 | Takahashi | H01L 21/6715 118/300 |
| 8,545,929 B2 | 10/2013 | Espenschied et al. | |
| 8,662,352 B1 | 3/2014 | des Jardins et al. | |
| 9,120,116 B2 | 9/2015 | Gorman et al. | |
| 9,579,578 B2 * | 2/2017 | Chasteen | A63G 21/22 |
| 2002/0060226 A1 | 5/2002 | Kameyama | |
| 2007/0062642 A1 | 3/2007 | Reck et al. | |
| 2008/0000421 A1 | 1/2008 | Ooshima et al. | |
| 2008/0006650 A1 | 1/2008 | Tseng et al. | |
| 2008/0107796 A1 | 5/2008 | Cho | |
| 2008/0210706 A1 | 9/2008 | Geier et al. | |
| 2008/0283550 A1 | 11/2008 | Nighy et al. | |
| 2009/0140007 A1 | 6/2009 | Voss | |
| 2010/0058985 A1 | 3/2010 | Kim et al. | |
| 2010/0212814 A1 | 8/2010 | Yamamoto | |
| 2010/0260531 A1 | 10/2010 | Rademacher | |
| 2010/0310765 A1 | 12/2010 | Olsson et al. | |
| 2011/0315114 A1 | 12/2011 | Hammond et al. | |
| 2012/0085282 A1 | 4/2012 | Ikagawa et al. | |
| 2012/0095588 A1 | 4/2012 | Barkmann et al. | |
| 2012/0104033 A1 | 5/2012 | MacIndoe | |
| 2012/0175386 A1 | 7/2012 | Tracy et al. | |
| 2012/0211518 A1 | 8/2012 | Freidin | |
| 2012/0325864 A1 | 12/2012 | Imaizumi et al. | |
| 2013/0233891 A1 | 9/2013 | Ikushima | |
| 2014/0135972 A1 | 5/2014 | Galeb | |
| 2014/0138400 A1 | 5/2014 | Donner et al. | |
| 2014/0353333 A1 | 12/2014 | Gorman et al. | |

FOREIGN PATENT DOCUMENTS

| | | |
|---|---|---|
| GB | 2069726 A | 8/1981 |
| WO | 8903104 A1 | 4/1989 |
| WO | 9713586 A1 | 4/1997 |
| WO | 2008002825 A1 | 1/2008 |
| WO | 2014081536 A1 | 5/2014 |

OTHER PUBLICATIONS

International Application No. PCT/US2015/067300: Invitation to Pay Additional Fees dated Jun. 13, 2016, 7 pages.
International Application No. PCT/ US2013/067169: International Search Report and Written Opinion dated Mar. 4, 2014, 11 pages.
(IPEA/409) International Preliminary Report on Patentability Chapter II or (IB/373) International Preliminary Report on Patentability Chapter I dated Jul. 20, 2017 for WO Application No. PCT/US15/067300.

* cited by examiner

DISPENSER AND METHOD OF DISPENSING AND CONTROLLING WITH A FLOW METER

CROSS REFERENCE TO RELATED APPLICATIONS

This application claims priority to U.S. patent application Ser. No. 14/591,300, filed Jan. 7, 2015, and published as U.S. Patent App. Pub. No. 2016/0193619 on Jul. 7, 2016, which is incorporated by reference herein in its entirety.

TECHNICAL FIELD

The present invention relates generally to the field of fluid dispensers that accurately dispense small amounts of fluids in various forms such as dots or droplets, or lines.

BACKGROUND

In the manufacture of various items, such as printed circuit ("PC") boards, it is frequently necessary to apply small amounts of fluid materials. Such materials include, by way of example and not by limitation, general purpose adhesives, solder paste, solder flux, solder mask, grease, oil, encapsulants, potting compounds, epoxies, die attach pastes, silicones, RTV and cyanoacrylates. While examples are given herein related generally to PC board manufacturing processes, it will be appreciated that the invention is applicable to many other fluid dispensing processes that would benefit from improved flow control.

As one example, a fabrication process known as flip chip technology has developed, which has multiple processes that require fluid dispensing. For example, a semiconductor die or flip chip is first attached to a PC board via solder balls or pads, and in this process, a viscous solder flux is applied between the flip chip and the PC board. Next, a viscous liquid epoxy is dispensed and allowed to flow and completely cover the underside of the chip. This underfill operation requires that a precise amount of the liquid epoxy be deposited along at least one side edge of the semiconductor chip. As the volume of the epoxy decreases during the curing process, a pseudo-hydrostatic state of stress will be imposed on the solder balls or pads, and this will provide resistance to deformation of the solder balls or pads, and therefore resistance to fracture. The liquid epoxy flows under the chip as a result of capillary action due to the small gap between the underside of the chip and the upper surface of the PC board. Once the underfill operation is complete, it is desirable that enough liquid epoxy be deposited to encapsulate all of the electrical interconnections, so that a fillet is formed along the side edges of the chip. A properly formed fillet ensures that enough epoxy has been deposited to provide maximum mechanical strength of the bond between the chip and the PC board. It is critical to the quality of the underfilling process that the exact amount of epoxy is deposited at exactly the right location. Too little epoxy can result in corrosion and excessive thermal stresses. Too much epoxy can flow beyond the underside of the chip and interfere with other semiconductor devices and interconnections. These parameters must be accurately controlled in the context of manufacturing environments that require high speed productivity.

In another application, a chip is bonded to a PC board. In this application, a pattern of adhesive is deposited on the PC board; and the chip is placed over the adhesive with a downward pressure. The adhesive pattern is designed so that the adhesive flows evenly between the bottom of the chip and the PC board and does not flow out from beneath the chip. Again, in this application, it is important that a precise amount of adhesive be deposited at exact locations on the PC board.

The PC board is often being carried by a conveyor past a fluid dispenser that is mounted for movement above the PC board. The moving dispenser is often of the type capable of depositing small dots or droplets of fluid material at desired locations on the PC board. This type of dispenser is commonly referred to as a non-contact jetting dispenser. There are several variables that are often controlled in order to provide a high quality fluid dispensing process. First, the weight or size of each of the dots is controlled. Known fluid dispensers have closed loop controls that are designed to hold the dot size constant during the material dispensing process. It is known to control the dispensed weight or dot size by varying the supply pressure of the fluid, the on-time of a dispensing valve within the dispenser and the stroke length of a valve member of the jetting dispenser. Known control loops have advantages and disadvantages depending on the design of a particular dispenser and the fluid being dispensed. However, known techniques often require additional components and mechanical structure, such as weigh scales, thereby introducing additional cost, time and reliability issues. Further, known methods often involve the use of calibration procedures, separate from the manufacturing process, which reduces productivity. Therefore, there is a continuing need to provide faster and simpler means for controlling parameters such as dot size, and dispensed fluid volume or weight.

Another important variable that may be controlled in the dispensing process is the total amount or volume of fluid to be dispensed in a particular cycle. Often the designer of a chip packaging specifies the total amount or volume of fluid, for example, epoxy in underfilling, or adhesive in bonding, that is to be used in order to provide a desired underfilling or bonding process. In jetting, for example, for a given dot size and dispenser velocity, it is known to program a dispenser control so that the dispenser dispenses a proper number of dots to dispense a specified amount of the fluid in a desired line or pattern at the desired location. Such a system is reasonably effective when the dispensing parameters remain constant. However, such parameters are constantly changing, albeit, often only slightly over the short term. The cumulative effect of such changes can result in an undesirable change in the volume of fluid being dispensed by the dispenser. Therefore, there is also a need for a control system that can determine dispensed weight and/or volume in an accurate but easy manner. In addition, there is a need for the real time detection of process excursions such as clog detection, leak detection, and air bubble detection.

Generally, there is a need for an improved computer controlled fluid dispensing system that addresses these and other challenges of accurately dispensing small amounts of fluid in high productivity manufacturing processes and the like.

SUMMARY

In a first illustrative embodiment, the invention provides a fluid dispensing system for accurately dispensing fluid and controlling a dispensing operation. The system includes a fluid dispenser with an inlet and an outlet, the dispenser being operable to start and stop the flow of the fluid from the outlet onto a substrate. A fluid supply reservoir is adapted to hold the fluid, and has an outlet coupled in fluid communication with the inlet of the fluid dispenser to establish a flow path for the fluid between the fluid supply reservoir and the outlet of the fluid dispenser. The fluid supply reservoir further includes a pneumatic input coupled to an air flow path adapted to receive pressurized air for forcing the fluid from the outlet of the reservoir. An electronic air mass flow meter device is operatively coupled to the air flow path to produce electrical output signals proportional to the mass flow rate of the air flowing through the pneumatic input. A pressure regulator is operatively coupled to the air flow path. A pressure low pass filter is coupled downstream of the pressure regulator and upstream of the pneumatic input in the air flow path. The pressure low pass filter comprises one or more components that attenuate high frequency changes in pressure without impeding low frequency changes in pressure A control is operatively coupled to the electronic flow meter for receiving and processing the electrical output signals.

The pressure low pass filter further may take various forms such as air flow restrictor devices which may be passive or adjustable and at least one air expansion tank.

In other aspects, the system may include an electronic temperature detector operatively coupled to the air flow path to produce electrical output signals proportional to the temperature of the air flowing through the pneumatic input. The temperature detector is operatively coupled to the control for providing a compensation factor used during processing of the electrical output signals from the electronic air mass flow meter device. Other factors that may be compensated for include pressure and/or humidity of the air in the system. As further discussed below, when pressure low pass filters are used, together with one or more compensation factors directed to temperature, pressure and humidity of the air used to drive the fluid in the system, the readings from a sensitive mass air flow meter, designed to measure very low rates of air flow, will be most accurate.

The control is configured to calculate an actual volume of the fluid in the fluid supply reservoir using the electrical output signals from the electronic air mass flow meter and, for example, one or more of the compensating factors of temperature, pressure and humidity of the air being directed through the mass air flow meter device. Once the actual volume of the fluid is determined, a running total of fluid dispensed may be calculated, for example, by having the control keep track of the volume dispensed during each dispense cycle and subtracting those amounts from the initial total volume measurement. In this way, the real time volume of the fluid remaining in the reservoir or syringe may be tracked and, for example, an operator may be alerted to a low volume condition that requires replacement or refilling of the reservoir or syringe. In addition, an excursion from a nominal range can be detected and the operator may be alerted to take action to correct a problem.

In another illustrative aspect of the invention, a method of controlling a fluid dispensing system to accurately dispense fluid includes directing pressurized air in a flow path. The pressure of the air is regulated with a pressure regulator in the air flow path. The air is directed through a pressure low pass filter coupled to the air path at a location downstream of the pressure regulator. A fluid is directed from a fluid supply into a dispenser using pneumatic pressure in the flow path on an input side of the dispenser. The fluid is directed from an outlet of the dispenser. An electronic air mass flow meter device is operatively coupled to the air flow path to produce electrical output signals proportional to the flow rate of the air flowing through the flow path. The electrical output signals from the electronic flow meter device are processed to perform a control function, such as a volume measurement or other function such as disclosed herein. The method may include any of the additional steps involving, for example, a pressure low pass filter discussed herein, or one or more of the temperature, pressure or humidity compensation methods discussed herein.

In another method, the air may not be directed through a pressure low pass filter, however, the method will involve the step of using at least one of an electronic temperature detector operatively coupled to the air flow path, an electronic pressure detector operatively coupled to the air flow path, or an electronic humidity detector operatively coupled to the air flow path for providing a compensation factor used during processing of the electrical output signals from the electronic air mass flow meter device. As with other methods disclosed herein, calculating an actual volume of the fluid in the fluid supply reservoir is accomplished using the electrical output signals from the electronic air mass flow meter, as well as any compensating factor determined from pressure, temperature and/or humidity measurements taken of the air flow.

In another method, a volume of fluid in a fluid supply reservoir of a fluid dispensing system is determined in an efficient manner. The method includes directing pressurized air in a closed air flow path leading to the fluid supply reservoir. The pressure of the air is regulated with a pressure regulator in the closed air flow path to a first pressure. The pressure of the air is changed with the pressure regulator to a second pressure different from the first pressure. An electronic air mass flow meter device operatively coupled to the air flow path is used to produce electrical output signals proportional to the flow rate of the air flowing through the flow path during the change between the first and second pressures. The electrical output signals from the electronic flow meter device are then processed to determine the actual volume of fluid in the fluid supply reservoir using the electrical output signals.

In another method, the stroke length of a valve having a fluid inlet is set in an efficient manner. This method generally comprises directing pressurized air to the fluid inlet of the valve. The valve is then adjusted to a closed position. The closed position is detected using an electronic air flow meter to indicate when air flow through the fluid inlet has reached a set point. The valve is then adjusted from the set point to a desired open position defined by the stroke length.

These and other objects and advantages of the invention will become more readily apparent during the following detailed description taken in conjunction with the drawings herein.

DETAILED DESCRIPTION

Generally, the present invention is embodied in various systems and methods that utilize the characteristics of air flow to determine fluid dispense characteristics during a dispense process. In these systems, a fluid supply container or reservoir, such as a syringe, relies on pressurized air to force the fluid from the supply container to a dispense valve, such as a jetting type dispenser that dispenses discrete dots or droplets of the fluid onto the desired substrate. For example, in various dispense systems the air drives a piston or plunger in a syringe which, in turn, forces the fluid into the dispense valve. Complicating factors for this type of process include the fact that the air is compressible and its density changes with changes in temperature, pressure, and humidity. Another complicating factor is that the flow of the fluid from the syringe or other fluid supply container is not constant. For example, when using a jetting dispenser or valve, the changes in fluid flow are sudden and often bidirectional because the jetting dispenser tends to displace fluid back into the syringe at one point of the dispense cycle. Because the fluid flow rate changes quickly, the pressurized air flow used to force the fluid into the dispenser can experience similar abrupt flow rate changes, which are also bidirectional. A third complicating factor is that the air temperature in the syringe can change during the measurement period. The syringe is moving around within a robot, for example, that may be heated or cooled and there can be heat transfer between the air and the syringe and the surrounding environment. The same is true for the air supply tube leading to the syringe. A change in temperature changes the air density and thus changes the measured volume of air. A fourth complicating factor relates to the air potential instability of the pressurized supply. Typically, the air supply to the syringe or fluid supply container is regulated with either a pulse width modulated device or a mechanical air regulator or valve. As the air pressure in the syringe drops, the regulator supplies more air. A mass flow meter used in this supply line is very sensitive and the changes in air supply create flow that is seen as noise to this sensor.

Figure 1:
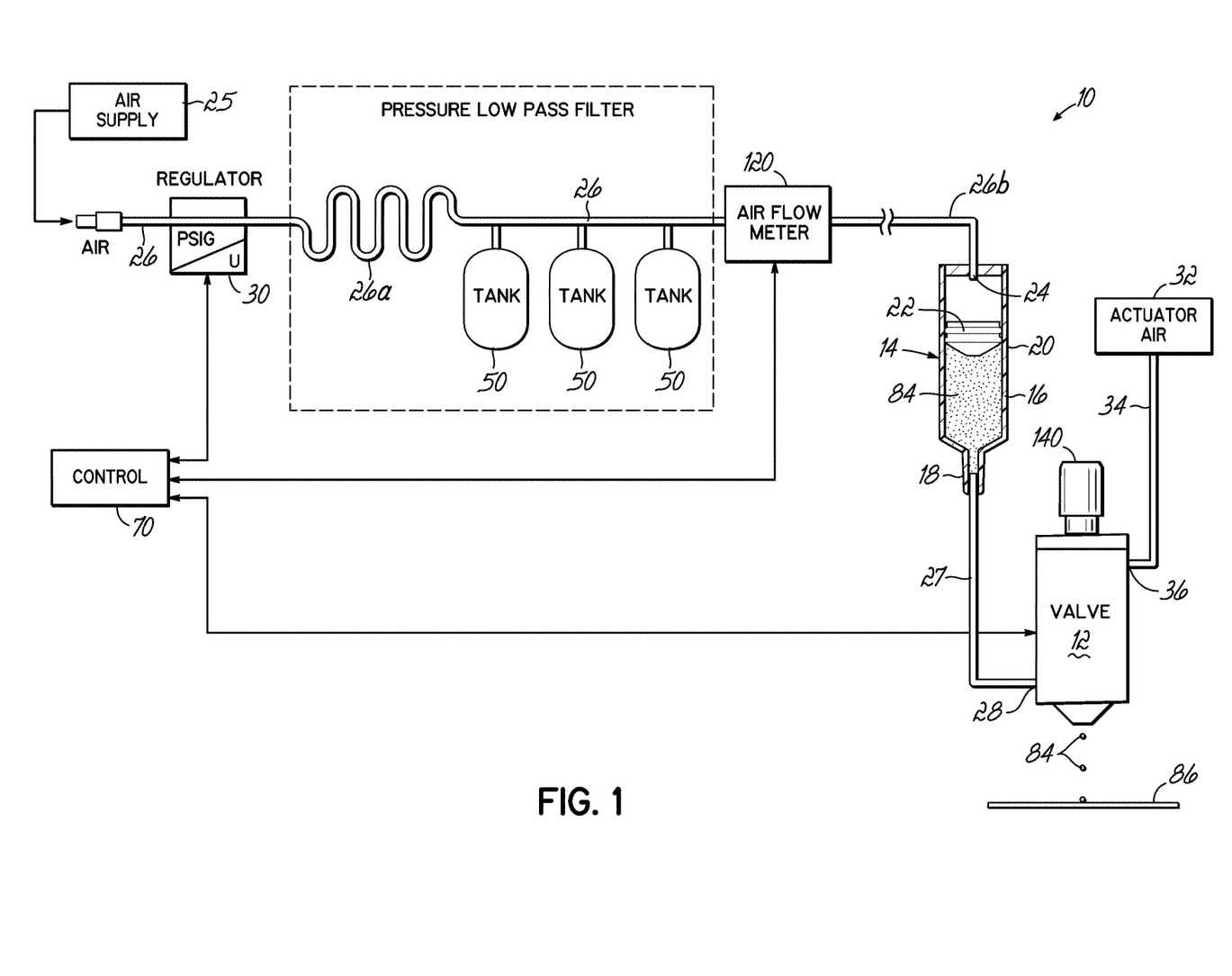
FIG. 1 is a schematic illustration of a first embodiment of a system constructed in accordance with the invention.

FIG. 1 illustrates a first embodiment of a jetting dispense system 10. The system 10 includes a jetting dispenser, such as a valve 12 coupled with a fluid supply, in the illustrative form of a piston operated syringe 14 schematically illustrated, as shown. It will be appreciated that components of the system 10 may take on many optional forms or types. For example, the valve 12 may be an on/off valve that dispenses various types of fluid patterns, or it may be a jetting valve, a pump or any other type of dispenser depending on the application needs. In the exemplary or illustrative embodiments disclosed, the syringe 14 includes a syringe body 16 with an outlet 18 and a reservoir portion 20, as well as a plunger or piston 22 that is movable through the force of pressurized air directed through an air input 24. The pressurized air is supplied by an air supply 25, which may be simply shop or house air, for example, at about 100 psi. The air is supplied into an air line 26, which may be suitable flexible tubing, such as polyurethane tubing. The fluid outlet 18 is connected to a line 27 leading to a fluid inlet 28 of valve 12. The air line 26 leads into a pressure regulator 30 that reduces the shop or house air to suitable system pressure, such as 30 psi. The pressure regulator 30 therefore serves as a first manner of providing low pressure stability to the pneumatic side of the system 10. A pressurized air supply 32 is also provided for the actuating section of the valve 12. Thus, an air line 34 leads to an inlet 36. It will be appreciated that the valve 12 may be actuated in other manners instead, such as electric.

As additional methods or means for providing stability, and reducing transients or peaks and valleys in the air pressure, a pressure low pass filter is placed between the pressure regulator 30 and an air flow meter 120. The air flow meter 120 may have various levels of sophistication depending on the circumstances, as will be described herein. An air mass flow sensor 40 (FIG. 3) is described herein and is generally a device that provides a raw signal that is a function of the mass of air that flows through the sensor. The air flow meter 120 is generally a combination of the sensor 40 and other sensors that are used to accurately measure volumetric flow. For purposes of providing the pressure low pass filter, for example, one or more tanks 50 for the air are coupled in the supply air path or line 26 between the pressure regulator 30 and the air flow meter 120. To further mitigate the problem of transient air flow, a long length of small diameter tubing 26a (such as 20 to 40 feet of tubing) is coupled between the pressure regulator 30 and tanks 50 creating flow resistance for the air. In similar manner, a length of tubing 26b may be coupled downstream of the flow meter 120. This allows the flow meter 120 to be sized so that its dynamic range of measurement can be compressed to give high resolution over the range of flow desired. The length of tubing and resistance will be determined by the specific performance of the dispenser 12. The pressure low pass "filters 26b, will average out the air flow to and from the reservoir or syringe 14 and, therefore, the air flow meter 120 is measuring the average air flow that takes place over a given period of time (t). As will be described in regard to subsequent embodiments, the flow restriction or filter provided by the long length of tubing 26a may instead or in addition be another type of flow restriction device, which may or may not be adjustable. All signals are sent to a control 70 are processed in accordance with the general methods as discussed further below. It will be appreciated that the "control" 70 may include one or more components, as are generally conventional in digital processing, for controlling not only the specific components as described herein, but also other operational components such as those associated with the valve 12. In this regard, the valve 12 may have one or more temperature sensors, one or more heaters, and electric actuators such as solenoids for controlling its actuation, as well as other operational components.

Figure 2:
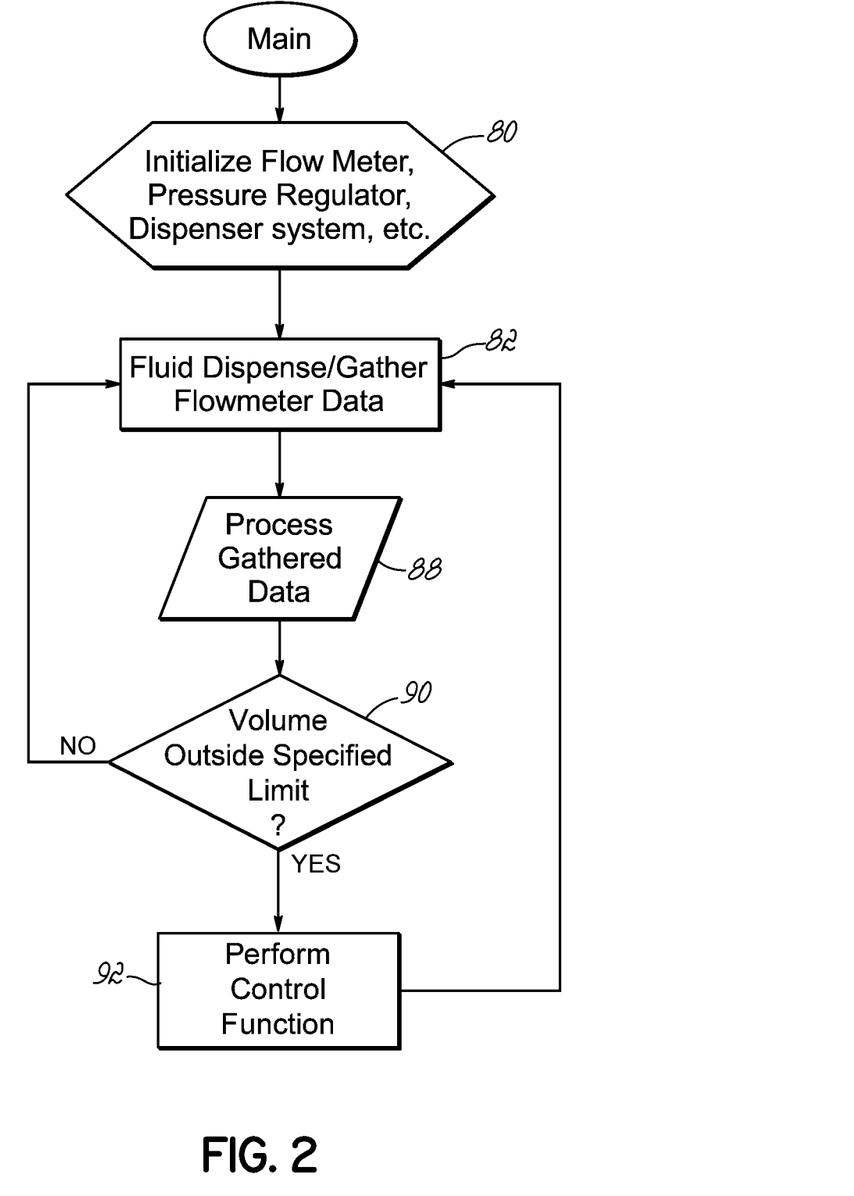
FIG. 2 is a basic flow chart describing a general method that may be carried out by the control shown in FIG. 1.

FIG. 2 illustrates a general flow diagram of the software to be implemented and carried out by the control 70 of FIG. 1. In a first step 80, the pressure regulator 30, flow meter 120 and any other control components associated with the dispenser 12 are initialized to start a dispensing operation. In the next step 82 the dispenser 12 begins dispensing the fluid in the desired manner, as programmed and carried out by the control 70, for example, to rapidly dispense multiple dots or droplets, or a line of the fluid 84 onto the substrate 86 (FIG. 1). While the dispensing operation is being carried out, air flow data points (signals) are collected by the control 70 from the flow meter 120. This data is processed in step 88, in one or more manners, to be discussed further below. In step 90, the collected data is processed, such as for purposes of calculating the volume of fluid 84 in the syringe 14. A control function 92 is then performed by the control 70 based on the calculation, such as informing the operator of a low volume condition in the syringe 14.

Figure 3:
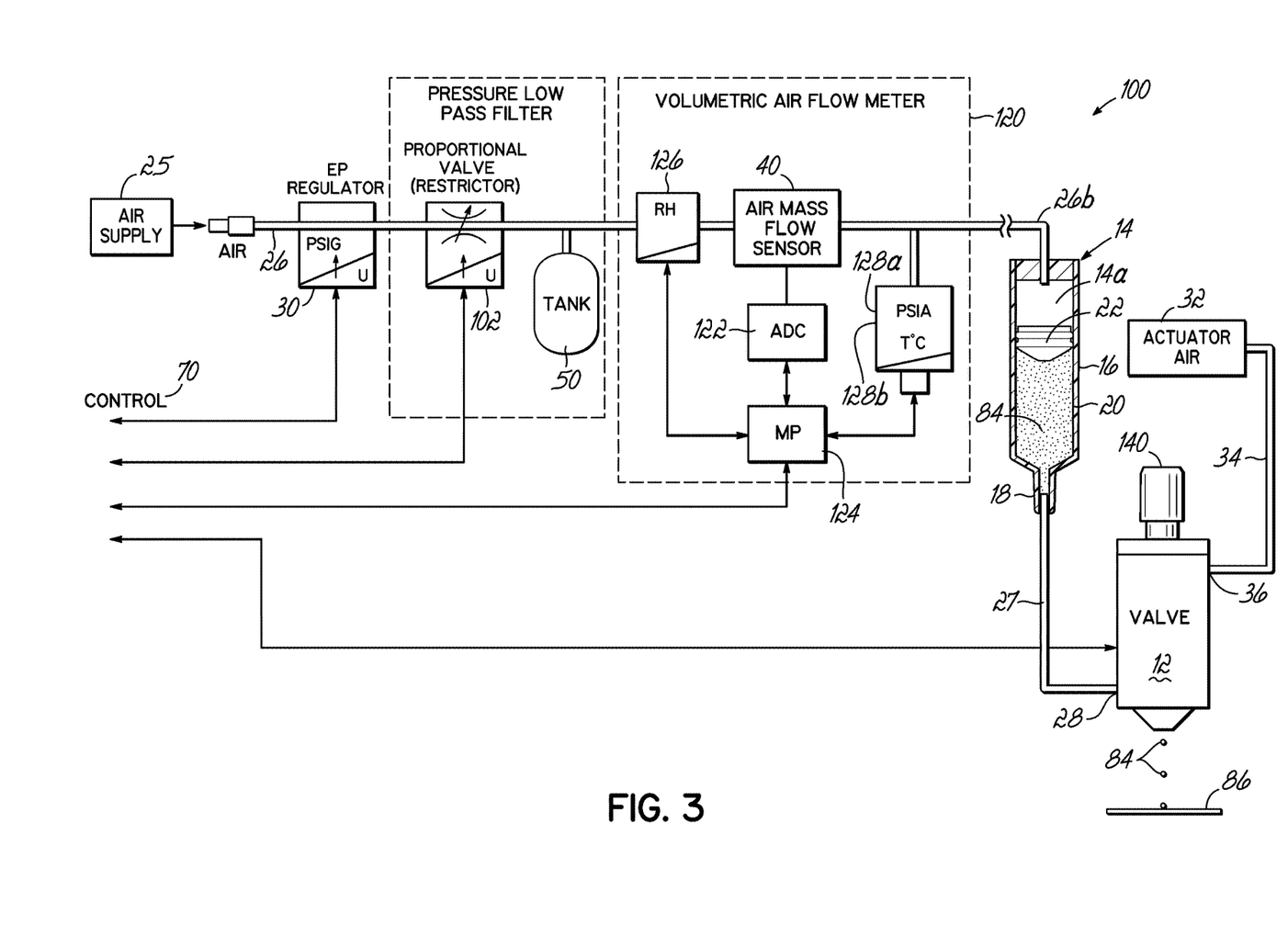
FIG. 3 is a schematic illustration, similar to FIG. 1, but illustrating another illustrative embodiment of a system constructed in accordance with the invention.

FIG. 3 illustrates another embodiment of a system 100, similar to that shown in FIG. 1. The components of the system 100 that are the same as described above with regard to FIG. 1 are denoted with the same reference numerals and have the same function. Therefore, these components need no further description here. FIG. 3 shows a single tank 50, however, as with the previous embodiment this may instead be multiple air tanks 50. As mentioned above in connection with FIG. 1, the long length of tubing 26a which serves as one form of pressure low pass filter has been replaced in the system 100 of FIG. 3 by a proportional valve 102 used as a restrictor device downstream of the pressure regulator 30. This proportional valve 102 is adjustable and is set so that if the air pressure is changed at the pressure regulator 30, it will take a desired period of time for the pressure at the air flow meter 120 to change to the new, adjusted pressure. For example, this time period may be designed to be 90 seconds. This flow restrictor 102 helps to reduce or essentially eliminate transients or abrupt changes in the air flow through the pneumatic portion of the dispense system. As air takes the place of the fluid material 84 in the reservoir or syringe 14, the electronic pressure regulator 30 will adjust or turn on and off in order to maintain system air pressure constant at the desired set point pressure. Therefore, this action will tend to create transient characteristics in the pneumatic portion of the system, or in other words abrupt air pressure changes. The proportional valve or restrictor 102, and the air expansion tank 50, will help ensure that the air flow meter 120 does not experience fast occurring transients or changes in air pressure. The air mass flow sensor 40 is chosen to be extremely sensitive because the fluid dispensing that is occurring with the system 100 involves very small amounts of fluid, such as on the order of 20 microliters. Therefore, the amount of fluid dispensed while the air mass flow meter 120 is actually taking an air flow measurement and sending the data to the control 70 is a fraction of that fluid amount. With this system 100, and as an one of many possible examples, significant pressure transients (that is, abrupt and brief upward and downward changes in the air pressure) are averaged out over a desired time period such as 90 seconds. This helps ensure that these abrupt pressure changes do not negatively affect the measurements taken by the air flow meter 120. The signals produced by both the pressure regulator 30, the proportional valve 102 and the air flow meter 120 are sent bi-directionally to the control 70.

FIG. 3 illustrates a more sophisticated and accurate volumetric air flow meter 120 including the air mass flow sensor 40, as previously described. All other components that are denoted with the same reference numerals as shown and described with respect to FIG. 3 need no further description here, except as discussed below. An analog to digital converter 122 takes the analog signal produced by the air mass flow sensor 40 and converts it to a digital signal which is used by a microprocessor 124 communicating with the main control 70 or computer. The microprocessor 124 gathers the information from not only the air mass flow sensor 40, but also from a humidity sensor 126, as well as a pressure and temperature sensor 128a, 128b. In practice, a temperature sensor 128b is located in the flow meter 120 and another temperature sensor (not shown) is located as close as possible to the air section 14a of the reservoir or syringe 14 so that the temperature measured is as accurate as possible. In some environments, the temperature of the reservoir or syringe 14 is different than the temperature of the flow meter 120. In these situations, the temperature of the reservoir or syringe 14 is used in the calculations. If the temperatures are the same, then to reduce complexity, the system can include only the temperature sensor in the flow meter 120. These measurements are sent back to the main control 70, such as a computer, and air mass, temperature, humidity, and pressure are measured as a function of time (t) during a specified measurement time period. These measured values are sent to the main control 70 which then uses the equation as discussed below, based on the Gas Law, to compute the air volume associated with the fluid material reservoir, and thereby subsequently compute the fluid material volume in the syringe 14. This function may also be integrated in the microprocessor 124 in FIG. 3 if the processing power is sufficient. Stated generally another way, the volumetric air flow meter 120 measures the flow rate of the air during a specified time period, or the change in air volume as a function of time (t). Then, the control 70 integrates that result over the time period of the measurement to convert it to the total volume of air change over that period of time (t). The control 70 will integrate the amount of air flowing past the air flow meter in both directions, because the air mass flow sensor 40 is bidirectional. This negates the effects of various transient flow characteristics, because the air will travel in the air line 26 in both directions due to various occurrences, such as movement of the valve 12 by a robot, which squeezes and moves the flexible air line 26, as well as due to on and off operation of the valve 12. The syringe 14, as well as the air line 26b leading to the syringe 14 are thermally insulated in a manner sufficient to prevent temperature change of the air in the syringe 14. This is important, again, to reduce transient temperature swings that may affect the measurements taken by the sensitive air mass flow sensor 40. Thus, it will be understood that both upstream and downstream components provide stability to the air flow leading to the syringe 14 thereby ensuring that the measurements taken by the air mass flow sensor 40 and the subsequent calculations and determinations are as accurate as possible.

Figure 4:
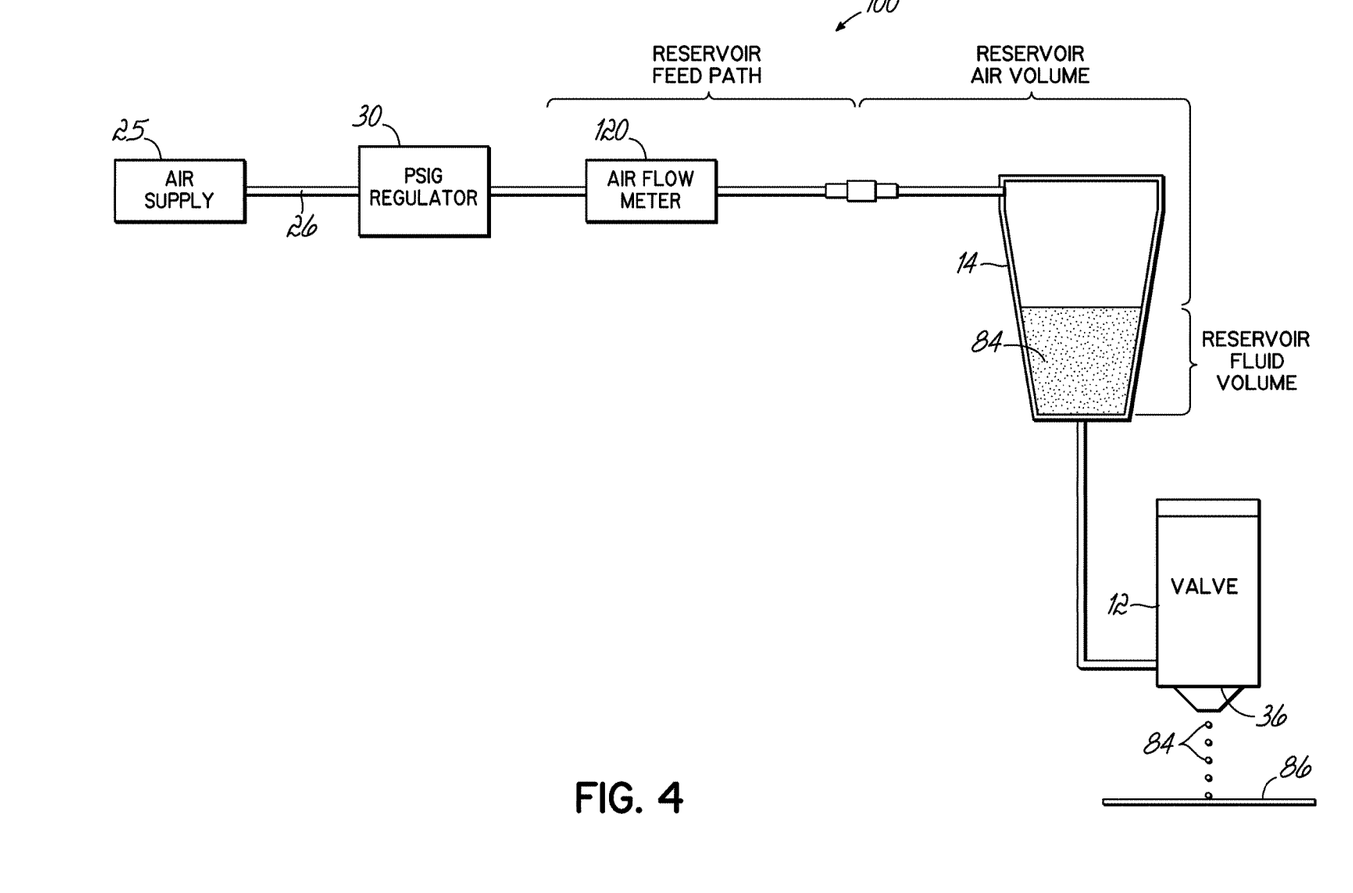
FIG. 4 is a schematic illustration of a dispense system for purposes of describing another embodiment of a method carried out by the control.

FIG. 4 illustrates a highly simplified version of a system 100' as previously described in connection with FIGS. 1 and 3, for purposes of understanding another embodiment of a method that may be carried out by the control 70. Generally, the goal of this method is to allow the actual volume in the fluid reservoir or syringe 14 to be determined or measured as needed on the fly to essentially re-zero the control system 70 with regard to the volume or amount of fluid 84 in the reservoir 14. As needed or desired, the dispensing operation may be stopped and a discrete pressure change in the pneumatic side of the system 100' may be used to determine the actual volume of fluid 84 in the reservoir 14. This will be described in more detail with reference to the flow chart shown in FIG. 5. However, generally, the air pressure is changed from, for example, 30 psi to 35 psi using the pressure regulator 30. This will cause an amount of air to flow through the air mass flow sensor 40 shown in FIG. 4, or, for example, the volumetric air flow meter 120 shown in FIG. 3. During this pressure change, the jetting dispensing valve 12 is closed. The air flow will stop once the pressure reaches the new set point of 35 psi. Using the equation as described below, determining the actual fluid volume in the syringe 14 is possible because new values are measured during a pressure change from 30 psi to 35 psi. This gives a measurement of fluid volume that is actually present in the reservoir or syringe 14 at that time. In this manner, the control 70 and operator essentially can clear the accumulated errors in the control 70 by taking a new measurement. One may periodically perform this operation, as desired, and as set in the control 70. As shown below, the equation is used to solve for volume in the case in which air pressure is changed, e.g., from 30 psi to 35 psi.

Flow Meter Measurements Processing

The air mass flow sensor 40 measures the mass flow of air referenced to "normal" conditions $P_n$, $T_n$ and $RH_n$ which are chosen and set by the manufacturer of the air mass flow sensor 40. The following equation is used to determine volumetric flow rate (V) from mass flow rate (M) under actual conditions:

$$V = M \frac{Pn - (RHn \cdot PVn)}{Pa - (RHa \cdot PVa)} \cdot \frac{Ta}{Tn}$$

Where:
Pn—Normal absolute pressure (PSIA)
Pa—Actual absolute pressure (PSIA)
RHn-Normal relative humidity (%)
RHa—Actual relative humidity (%)
PVn—Saturated water vapor pressure at normal temperature (PSIA)
PVa—Saturated water vapor pressure at actual temperature (PSIA)
Tn—Normal temperature (° R) Note: ° R=° F.+460=9/5· (° C.-+273.15)
Ta—Actual temperature (° R)

$$PV[psi] = \frac{10\left(0.07131 \cdot \frac{1730.63}{233.426 + T}\right)}{51.7149326}, t = (1 - 100)° C. \quad [3]$$

$$\frac{V}{M} = \frac{14.69}{14.69 - 0.5 \cdot 0.40612} = 1.014,$$

what gives substantial 1.4% error.

The following equations and algorithm define the process of using the mass flow meter 120 to determine the fluid level in the syringe 14.

The goal of this example is to measure the volume of fluid 84 in the syringe 14.

The bulk modulus of the fluid 84 in the syringe 14 is many orders of magnitude higher than the air that is flowing into the syringe 14.

It is possible to measure the temperature (Ta), pressure (Pa), and relative humidity (RHa) of the air in the syringe 14.

The equations below will not include compensation for relative humidity (RHa), but will assume the use of dry air. The purpose is to describe the general algorithm here. Humidity compensation is added as described above, to achieve further accuracy.

Definitions

Vse—volume of an empty syringe 14.
Vsys—volume of the air path between the mass flow sensor 40 and the syringe 14+the volume of the empty syringe 14 (including associated air lines, fittings, etc.)
Vf—volume of the fluid 84 in the syringe 14.
Va—volume of the air path between the mass flow sensor and syringe 14+the volume of the syringe with fluid in it. (Vf=Vsys-Va)
Px—Absolute Air Pressure time x
Tx—absolute temperature at time x
n—moles of gas
Mx—molar mass of gas (Ma for air)
DeltaM—mass of air measured between time x and y
R—universal gas constant value of 0.08206 (atm·L)/(mol·K).

Universal gas Law: PV=nRT
Conversion of mass to moles: n=m/M
Substituting conversion into the universal gas law:

$$PV = \frac{m \cdot R \cdot T}{M}$$

Solving for mass:

$$m = \frac{P \cdot V \cdot M}{R \cdot T}$$

In accordance with this method the air pressure is changed from time 1 to time 2, and the change in air mass is calculated. Temperatures and Pressures are measured at time 1 and 2.

$$m_2 - m_1 = \frac{P_2 \cdot V_2 \cdot M}{R \cdot T_2} - \frac{P_1 \cdot V_1 \cdot M}{R \cdot T_1}$$

Since the volume has not changed:

$$V_2 = V_1$$

Solving for V:

$$V = (m_2 - m_1) \frac{R}{M} \left(\frac{P_2}{T_2} - \frac{P_1}{T_1}\right)^{-1}$$

Or:

$$V_X = \Delta m_x \cdot \frac{R}{M} \left(\frac{P_2}{T_2} - \frac{P_1}{T_1}\right)^{-1}$$

Where "$V_x$" could be "$V_{sys}$" or "$V_A$", depending on process step. With this formula, the closed volume can be measured.

Process:
1) Install an empty syringe 14.
2) Set the air pressure with the regulator 30 and allow it to stabilize.
3) Measure air pressure and temperature with sensors 128a, 128b.
4) Change the air pressure with regulator 30 and allow it to stabilize
5) Measure the air mass change, temperature, and pressure, and this is $m_{sys}$.
6) Calculate the volume, $V_{sys}$.
7) Install syringe 14 with fluid 84 in it.
8) Repeat steps 2 through 6 to obtain $V_A$. This is now $V_{sys}$-$V_f$ (the fluid 84 displaces air in the syringe 14).
9) $V_f$=$V_{sys}$-$V_A$.

$V_f$, or the volume of the fluid 84 in the syringe 14, can be updated by measuring the dispensed volume of fluid from the flow meter measurements and subtracting it from the previous value of $V_f$.

Since there will be some accumulated error from the dispensed volume measurements, it is possible to re-set $V_f$ by repeating the process steps 8 and 9 at times that it is deemed necessary. Note that it will not be necessary to re-measure $V_{sys}$ unless the type of fluid reservoir is changed Example Calculations:

$R := 8.3144 \; m^3 Pa \cdot K^{-1} \cdot mol^{-1}$ Universal gas constant in *SI* units $Ma := 28.956 \frac{gm}{mol}$ $Ma = 0.029 \frac{kg}{mol}$ Conversion of mole to kg for dry atmospheric air.

T1:=(25+273.15)K Measured temperature is 25 C, need to convert to absolute temperature in K.
T1:=298.15K
T2:=(28+273.15)K
P1:=25 psi (note: absolute pressure)
P1=1.724×10$^5$ Pa
P2:=45 psi (note: absolute pressure)
P2=3.103×10$^5$ Pa
Δmsys:=100 mg
Δmsys=1×10$^{-4}$ kg $$Vsys := \Delta msys \cdot \frac{R}{Ma \cdot \left(\frac{P2}{T2} - \frac{P1}{T1}\right)}$$

Vsys=0.064 L

It will be appreciated that, using the calculations and parameters set forth herein, volume values associated with the fluid may be calculated and used in various manners. For example, the volume value may be the actual volume of fluid in the fluid supply reservoir. The volume value may instead, or in addition, be the volume of fluid dispensed by the fluid dispenser in a single dispense operation or in multiple, successive dispense operations. For example, an initial volume in the fluid supply reservoir or syringe may be calculated. Then, successive volumes of the fluid may be dispensed from the fluid dispenser. Then, these volume values are subtracted from the initial, actual volume calculated in the fluid supply reservoir. This will yield a result equaling the remaining volume of fluid in the fluid supply reservoir. In order to eliminate any accumulated error in this calculation, the method described above may be used to calculate the actual volume of fluid in the fluid supply reservoir.

Various additional actions may be taken based on the volume values calculated by the control. For example, in response to calculating the fluid volume in the supply reservoir using a method disclosed herein, an electrical alarm may be activated indicating a low fluid level in the fluid supply reservoir. Comparing a first calculated actual volume to a second calculated actual volume after a fluid dispensing operation will yield the dispensed volume of fluid resulting from that dispensing operation. The dispensed volume of fluid may be compared by the control to a target volume and the process can further include changing at least one of: the pressure of the air in the flow path, a relative speed of movement between the fluid dispenser and a substrate being dispensed on, or a fluid pattern being dispensed by the fluid dispenser. This change can be used to match or at least more closely associate the dispensed volume of fluid to the target volume of fluid. In addition, or in the alternative, a discrepancy between the dispensed volume of fluid and the target volume of fluid may be determined and the control activates an electrical alarm indicating the presence of a discrepancy between the dispensed volume and the target volume. Also, if the density of the fluid is known, it may be used to calculate the mass of the dispensed volume calculated by the control. Alternatively, or in addition, the mass of the dispensed volume of fluid may be determined, such as by using a weigh scale, and the calculated dispensed volume may be used with the determined mass to calculate the density of the dispensed volume (v=m/d). This may be useful in those situations where the density of the fluid may change over time, such as the settling of a particulate material within a fluid. In this case, if the density is out of range, corrective measures may be taken to replace the fluid, better mix the fluid, etc. If the calculated density is out of range with respect to a target density, a comparison of these two figures may be used to allow the control to activate an electrical alarm to an operator.

Figure 5:
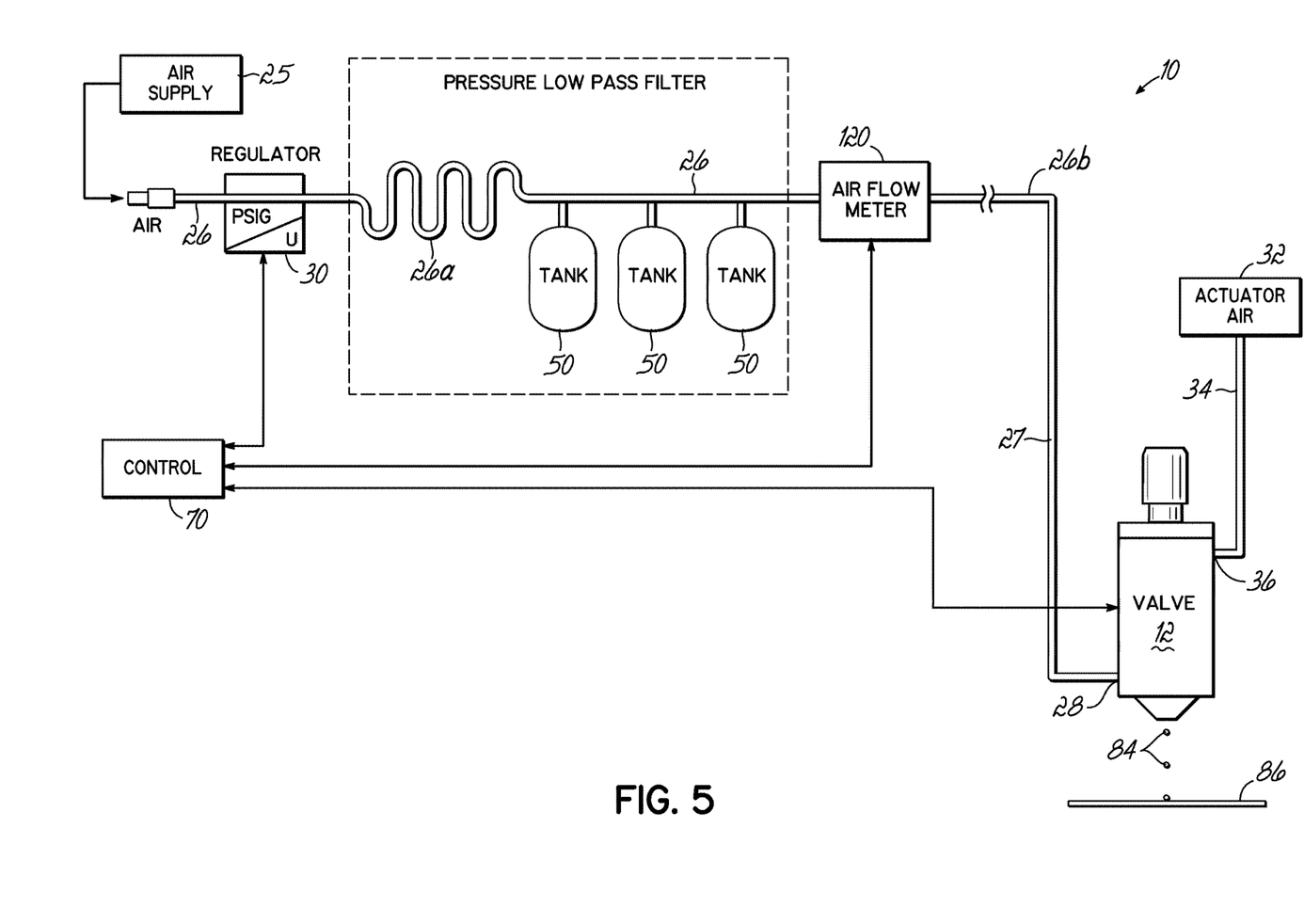
FIG. 5 is a schematic illustration, similar to FIG. 1, but illustrating a method of setting a zero point of a dispenser valve.

Referring now to FIG. 5, the systems described herein may also be used to determine when the zero point of the jetting valve or dispenser is reached during setup. When a new or initial jetting dispenser or valve 12 is installed to the system 10, 100, 100', there is a need to adjust the closed position of the valve 12, generally referred to as the zero point, and then to set the stroke length of the valve 12. The stroke length of the valve 12 refers to the distance that the valve stem moves from its fully open position to its fully closed position. In several different types of jetting dispensers or valves 12, such as the DJ9000 available from Nordson Corporation, Asymtek Division, this setting is made by an operator by tactile feel and has set up-to-set up variability based on this fact, as well as component wear, general condition, and cleanliness. In accordance with another method of the present invention, any of the systems disclosed herein may be used to determine when the jetting valve zero point is reached during setup. That is, the measurement of the air flow mass as described above may be used for this purpose. With reference to FIG. 5, a clean and fully assembled jetting dispenser or valve 12 is installed in the system but without any fluid material in the system and without a supply syringe 14 installed. The air line 34 is connected to enable driving the valve stem associated with the valve 12. The system air line 26b in communication with the mass air flow sensor 40 is directly coupled to the fluid material inlet 28, instead of connecting the reservoir or syringe 14 to the fluid material inlet 28. A jetting cartridge or valve setup routine may be programmed into the control 70 and activated. The valve 12 will be actuated to the operating state, in a open condition. Thus, system air will be flowing through the fluid material inlet 28 and out from the dispensing outlet of the valve 12 at a flow rate. Air pressure, at the required test pressure, will be supplied to the system air line 26, 26b. The mass air flow sensor 40 will measure the air flow rate and the operator will be instructed to adjust the valve micrometer 140 to increase or decrease the air flow rate as required. The operator will continue adjusting the micrometer 140 at the top of the jetting dispense valve 12 so as to close the valve stem and shut off the valve 12 and when the air flow rate reaches a set point, or is reduced below a set value, the operator is signaled that the zero point is set. For example, a green light or other indicator may be used on the control 70 to indicate that the zero point or closed position of the valve stem (not shown) associated with the jetting dispense valve 12, has been reached. The operator will then be instructed to set the micrometer 140 to the appropriate open value in increments, such as tactile clicks or another setting method which may be manual or automatic. In this regard, the micrometer 140 is typically turned in an opposite direction to that used to reach the set point in the previously described step. The set up is then finished and the air pressure in the system lines 26, 26*b*, as well as air pressure to the valve actuator inlet 36 are turned off. The set up flow values are logged for process verification and tracking. Then, in order to operate the system as previously described, the operator removes the system air connection from the fluid material inlet 28 and connects the reservoir or syringe 14 as previously described and shown in, for example, FIGS. 1 and 3.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A fluid dispensing system, comprising:
    a fluid dispenser including an inlet and an outlet, the dispenser being operable to start and stop a flow of fluid from the outlet onto a substrate;
    a fluid supply reservoir adapted to hold the fluid, and having an outlet coupled in fluid communication with the inlet of the fluid dispenser to establish a flow path for the fluid between the fluid supply reservoir and the outlet of the fluid dispenser, the fluid supply reservoir further including a pneumatic input coupled to an air flow path adapted to receive pressurized air for forcing the fluid from the outlet of the fluid supply reservoir, said fluid supply reservoir being thermally insulated;
    an electronic air flow meter device operatively coupled to the air flow path to produce electrical output signals that are each representative of a flow rate of the air flowing through the flow path; and
    a control operatively coupled to the electronic air flow meter device, the control receiving and processing the electrical output signals to determine a value associated with the fluid.

2. The fluid dispensing system of claim 1, wherein the electrical output signals produced by the electronic air flow meter device are proportional to the flow rate of the air flowing through the pneumatic input.

3. The fluid dispensing system of claim 1, further comprising a thermally insulated air supply line coupled between the electronic air flow meter device and the pneumatic input.

4. The fluid dispensing system of claim 1, further comprising:
    a pressure regulator operatively coupled to the air flow path; and
    a pressure low pass filter coupled downstream of the pressure regulator and upstream of the pneumatic input in the air flow path.

5. The fluid dispensing system of claim 4, wherein the pressure regulator is adjustable and used to set an adjustable pressure in the air flow path.

6. The fluid dispensing system of claim 4, wherein the pressure low pass filter comprises an air expansion tank or an air flow restrictor device.

7. The fluid dispensing system of claim 1, further comprising:
    an electronic temperature detector operatively coupled to the air flow path to produce electrical output signals, the electronic temperature detector operatively coupled to the control for providing a temperature compensation factor used during processing of the electrical output signals from the electronic air flow meter device.

8. The fluid dispensing system of claim 1, further comprising:
    an electronic pressure detector operatively coupled to the air flow path to produce electrical output signals, the electronic pressure detector operatively coupled to the control for providing a pressure compensation factor used during processing of the electrical output signals from the electronic air flow meter device.

9. The fluid dispensing system of claim 1, further comprising:
    an electronic humidity detector operatively coupled to the air flow path to produce electrical output signals, the electronic humidity detector operatively coupled to the control for providing a humidity compensation factor used during processing of the electrical output signals from the electronic air flow meter device.

10. The fluid dispensing system of claim 1, wherein the control receives and processes the electrical output signals to determine a volume value associated with the fluid.

11. The fluid dispensing system of claim 10, wherein the volume value associated with the fluid is a volume of fluid in the fluid supply reservoir.

12. The fluid dispensing system of claim 10, wherein the volume value associated with the fluid is a volume of fluid dispensed by the fluid dispenser.

13. The fluid dispensing system of claim 1, wherein the value represented by each electrical output signal is variable depending on the flow rate of the air.

14. A fluid dispensing system, comprising:
    a fluid dispenser including an inlet and an outlet, the dispenser being operable to start and stop a flow of fluid from the outlet onto a substrate;
    a fluid supply reservoir adapted to hold the fluid, and having an outlet coupled in fluid communication with the inlet of the fluid dispenser to establish a flow path for the fluid between the fluid supply reservoir and the outlet of the fluid dispenser, the fluid supply reservoir further including an pneumatic input coupled to an air flow path adapted to receive pressurized air for forcing the fluid from the outlet of the fluid supply reservoir, said fluid supply reservoir being thermally insulated;
    an electronic air flow meter device operatively coupled to the air flow path to produce electrical output signals;
    an electronic humidity detector operatively coupled to the air flow path to produce electrical output signals, the electronic humidity detector providing a humidity compensation factor; and
    a control operatively coupled to the electronic air flow meter device and the electronic humidity detector, the control receiving and processing the electrical output signals from the electronic air flow meter device and the humidity compensation factor to determine a value associated with the fluid.

15. The fluid dispensing system of claim 14, wherein the electrical output signals produced by the electronic air flow meter device are proportional to a flow rate of the air flowing through the pneumatic input.

16. The fluid dispensing system of claim 14, further comprising:
    a pressure regulator operatively coupled to the air flow path; and a pressure low pass filter coupled downstream of the pressure regulator and upstream of the pneumatic input in the air flow path.

17. The fluid dispensing system of claim 14, wherein the control receives and processes the electrical output signals to determine a volume value associated with the fluid.

18. The fluid dispensing system of claim 17, wherein the volume value associated with the fluid is a volume of fluid in the fluid supply reservoir.

19. The fluid dispensing system of claim 17, wherein the volume value associated with the fluid is a volume of fluid dispensed by the fluid dispenser.

20. A fluid dispensing system, comprising:
   a fluid dispenser including an inlet and an outlet, the dispenser being operable to start and stop a flow of fluid from the outlet onto a substrate;
   a fluid supply reservoir adapted to hold the fluid, and having an outlet coupled in fluid communication with the inlet of the fluid dispenser to establish a flow path for the fluid between the fluid supply reservoir and the outlet of the fluid dispenser, the fluid supply reservoir further including an pneumatic input coupled to an air flow path adapted to receive pressurized air for forcing the fluid from the outlet of the fluid supply reservoir, said fluid supply reservoir being thermally insulated;
   an electronic air flow meter device operatively coupled to the air flow path to produce electrical output signals;
   an electronic pressure detector operatively coupled to the air flow path to produce electrical output signals, the electronic pressure detector providing a pressure compensation factor; and
   a control operatively coupled to the electronic air flow meter device and the electronic pressure detector, the control receiving and processing the electrical output signals from the electronic air flow meter device and the pressure compensation factor to determine a value associated with the fluid.

21. The fluid dispensing system of claim 20, wherein the electrical output signals produced by the electronic air flow meter device are proportional to a flow rate of the air flowing through the pneumatic input.

22. The fluid dispensing system of claim 20, further comprising:
   a pressure regulator operatively coupled to the air flow path; and
   a pressure low pass filter coupled downstream of the pressure regulator and upstream of the pneumatic input in the air flow path.

23. The fluid dispensing system of claim 20, wherein the control receives and processes the electrical output signals to determine a volume value associated with the fluid.

24. The fluid dispensing system of claim 23, wherein the volume value associated with the fluid is a volume of fluid in the fluid supply reservoir.

25. The fluid dispensing system of claim 23, wherein the volume value associated with the fluid is a volume of fluid dispensed by the fluid dispenser.

26. A method of controlling a fluid dispensing system, the method comprising:
   directing pressurized air in a flow path;
   directing a fluid from a fluid supply reservoir into a fluid dispenser using pneumatic pressure in the flow path on an input side of the fluid dispensing system;
   discharging the fluid from an outlet of the fluid dispensing system;
   using an electronic air flow meter device operatively coupled to the flow path to produce electrical output signals that are each representative of a flow rate of the air flowing through the flow path; and
   processing the electrical output signals from the electronic air flow meter device to determine a value associated with the fluid.

27. The method of claim 26, wherein using the electronic air flow meter device operatively coupled to the flow path to produce electrical output signals comprises using the electronic air flow meter device operatively coupled to the flow path to produce the electrical output signals proportional to the flow rate of the air flowing through the flow path.

28. The method of claim 26, further comprising:
   regulating the pressure of the air with a pressure regulator in the flow path; and
   directing the air through a pressure low pass filter coupled to the flow path at a location downstream of the pressure regulator.

29. The method of claim 28, wherein directing the air through the pressure low pass filter further comprises directing the air through at least one of an air expansion tank or an air flow restrictor device.

30. The method of claim 26, further comprising:
   detecting a temperature of the air flowing through the flow path;
   producing electrical output signals; and
   processing the electrical output signals to determine a temperature compensation factor during processing of the electrical output signals from the electronic air flow meter device.

31. The method of claim 26, further comprising:
   detecting a pressure of the air flowing through the flow path;
   producing electrical output signals; and
   processing the electrical output signals to determine a pressure compensation factor during processing of the electrical output signals from the electronic air flow meter device.

32. The method of claim 26, further comprising:
   detecting a humidity of the air flowing through the flow path;
   producing electrical output signals; and
   processing the electrical output signals to determine a humidity compensation factor during processing of the electrical output signals from the electronic air flow meter device.

33. The method of claim 26, wherein processing the electrical output signals from the electronic air flow meter device to determine the value associated with the fluid comprises processing the electrical output signals from the electronic air flow meter device to determine a volume value associated with the fluid.

34. The method of claim 33, wherein processing the electrical output signals from the electronic air flow meter device to determine the volume value associated with the fluid comprises processing the electrical output signals from the electronic air flow meter device to determine an actual volume of the fluid in the fluid supply reservoir.

35. The method of claim 34, further comprising:
   determining that there is a low fluid level in the fluid supply reservoir based on the determined actual volume of the fluid in the fluid supply reservoir; and
   generating, in response to the determination that there is the low fluid level in the fluid supply reservoir, a signal indicating that there is the low fluid level in the fluid supply reservoir.

36. The method of claim 35, wherein generating the signal indicating that there is the low fluid level in the fluid supply reservoir comprises activating an electrical alarm indicating that there is the low fluid level in the fluid supply reservoir.

37. The method of claim 33, wherein processing the electrical output signals from the electronic air flow meter device to determine the volume value associated with the fluid comprises determining processing the electrical output signals from the electronic air flow meter device to determine a dispensed volume of fluid dispensed by the outlet of the fluid dispensing system.

38. The method of claim 37, further comprising:
comparing the dispensed volume of fluid to a target volume; and
changing, in response to the comparison of the dispensed volume of fluid to the target volume, at least one of the pressure of the air in the flow path, a relative speed of movement between the outlet of the fluid dispensing system and a substrate being dispensed on, and a fluid pattern being dispensed.

39. The method of claim 38, further comprising generating, in response to the comparison of the dispensed volume of fluid to the target volume, a signal indicating a discrepancy between the dispensed volume of fluid and the target volume.

40. The method of claim 39, wherein generating the signal indicating the discrepancy between the dispensed volume of fluid and the target volume comprises activating an electrical alarm indicating that there is the discrepancy between the dispensed volume of fluid and the target volume.

41. The method of claim 26, wherein the value represented by each electrical output signal is variable depending on the flow rate of the air.

* * * * *